US012452679B2

(12) United States Patent
Smith et al.

(10) Patent No.: US 12,452,679 B2
(45) Date of Patent: Oct. 21, 2025

(54) SECURE DEVICE LOCATION SHARING

(71) Applicant: Cisco Technology, Inc., San Jose, CA (US)

(72) Inventors: Malcolm M. Smith, Richardson, TX (US); Jerome Henry, Pittsboro, NC (US); Scott Ross Blue, Oulu (FI); Brian D. Hart, Sunnyvale, CA (US)

(73) Assignee: Cisco Technology, Inc.

( * ) Notice: Subject to any disclaimer, the term of this patent is extended or adjusted under 35 U.S.C. 154(b) by 182 days.

(21) Appl. No.: 18/495,193

(22) Filed: Oct. 26, 2023

(65) Prior Publication Data
US 2025/0142344 A1 May 1, 2025

(51) Int. Cl.
*H04L 29/06* (2006.01)
*H04W 12/062* (2021.01)
*H04W 12/63* (2021.01)
*H04W 12/71* (2021.01)

(52) U.S. Cl.
CPC ......... *H04W 12/71* (2021.01); *H04W 12/062* (2021.01); *H04W 12/63* (2021.01)

(58) Field of Classification Search
None
See application file for complete search history.

(56) References Cited

U.S. PATENT DOCUMENTS

| 11,330,546 | B1 | 5/2022 | Yannuzzi et al. | |
| 2017/0171833 | A1 | 6/2017 | Vamaraju et al. | |
| 2020/0367020 | A1* | 11/2020 | Ansley | H04W 16/14 |
| 2021/0068070 | A1* | 3/2021 | Segev | H04L 67/10 |
| 2021/0258773 | A1* | 8/2021 | Henry | H04W 12/50 |
| 2021/0368292 | A1 | 11/2021 | Sinha et al. | |
| 2022/0078727 | A1 | 3/2022 | Shennichetty et al. | |
| 2022/0330363 | A1* | 10/2022 | Taneja | H04W 36/0022 |
| 2022/0338010 | A1 | 10/2022 | Henry et al. | |
| 2024/0098615 | A1* | 3/2024 | Anantharaman | H04W 72/0473 |
| 2024/0196181 | A1* | 6/2024 | Grayson | H04W 12/06 |
| 2024/0224194 | A1* | 7/2024 | Grant | H04W 52/32 |
| 2025/0142344 | A1* | 5/2025 | Smith | H04W 12/062 |

* cited by examiner

*Primary Examiner* — Jeffery L Williams
(74) *Attorney, Agent, or Firm* — Merchant & Gould P.C.

(57) ABSTRACT

Secure device location sharing may be provided. Over a secured link, an indication that a peer-to-peer device desires Automated Frequency Coordination (AFC) based location sharing may be received. Then, from the peer-to-peer device over the secured link, an identity provider (IdP) may be received for the peer-to-peer device. Next, validation of the peer-to-peer device may be requested from the IdP. From the IdP in response to requesting validation of the peer-to-peer device from the IdP, authentication for the peer-to-peer device and an indication that the peer-to-peer device needs AFC based location sharing may be received. An indication that the peer-to-peer device is approved for AFC based location sharing may then be sent to the peer-to-peer device over the secured link.

20 Claims, 3 Drawing Sheets

US 12,452,679 B2

SECURE DEVICE LOCATION SHARING

TECHNICAL FIELD

The present disclosure relates generally to secure device location sharing.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
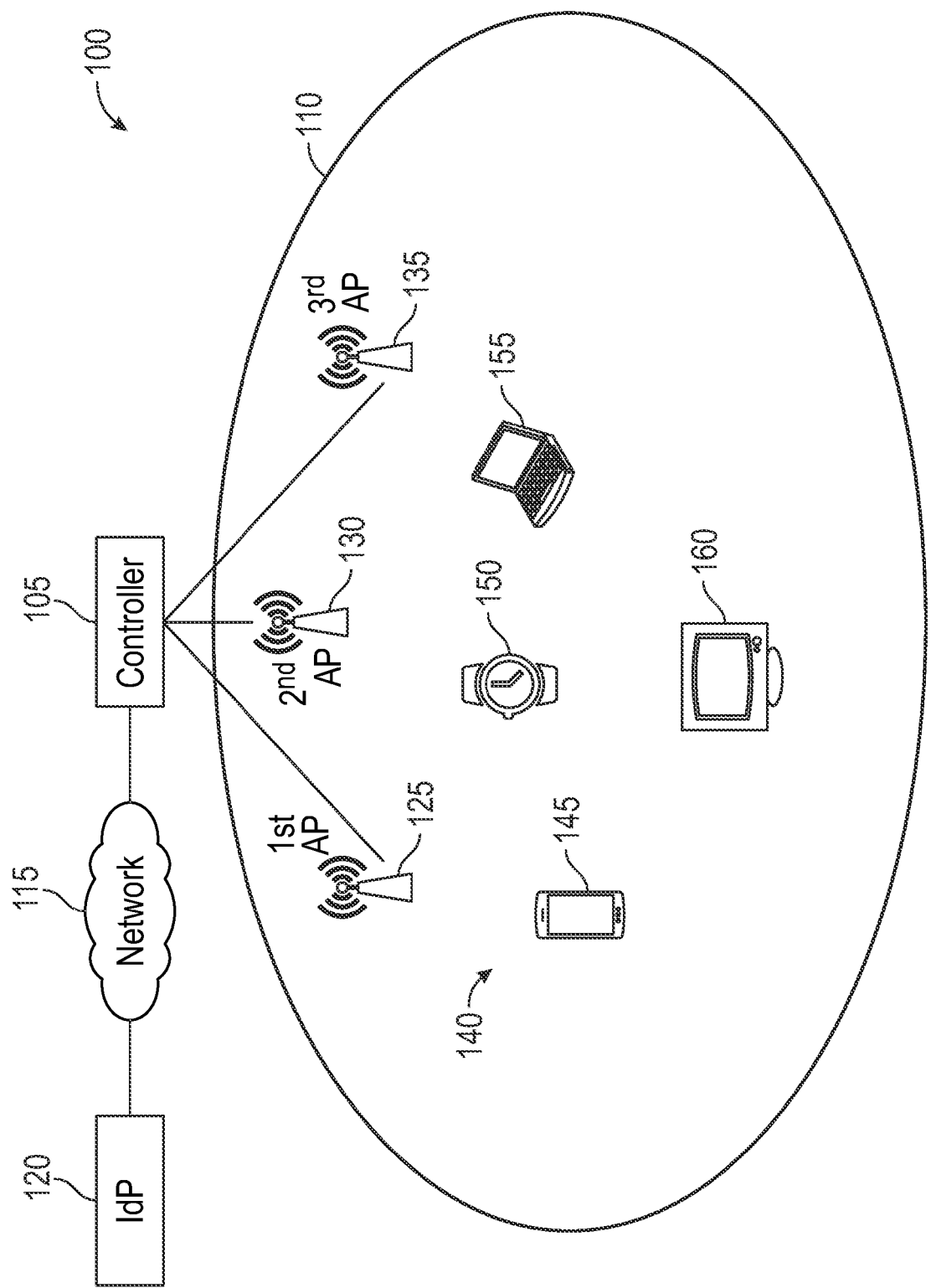
FIG. 1 is a block diagram of an operating environment for providing secure device location sharing.

Secure device location sharing may be provided. Over a secured link, an indication that a peer-to-peer device desires Automated Frequency Coordination (AFC) based location sharing may be received. Then, from the peer-to-peer device over the secured link, an identity provider (IdP) may be received for the peer-to-peer device. Next, validation of the peer-to-peer device may be requested from the IdP. From the IdP in response to requesting validation of the peer-to-peer device from the IdP, authentication for the peer-to-peer device and an indication that the peer-to-peer device needs AFC based location sharing may be received. An indication that the peer-to-peer device is approved for AFC based location sharing may then be sent to the peer-to-peer device over the secured link.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In wireless networks, peer-to-peer devices may be present. These peer-to-peer devices may comprise, for example, wearables (e.g., smart watches, displays, smart glasses, etc.) or functional objects comprising, for example, smartphones or laptops paired with wearables or Wi-Fi docking stations where the laptop, lid closed, uses its Wi-Fi connection to link to a dock where a large screen/keyboard/mouse may be connected. Although the increased presence of such peer-to-peer devices may be unavoidable, smart device onboarding may focus on the coexistence between these devices and a cell with the goal to provide good peer-to-peer Quality of Experience (QoE) without impact on infrastructure-centric operations.

In enterprise environments, some peer-to-peer devices may be allowed (e.g., docking stations), provided that they may be properly validated and identified by the infrastructure. Other peer-to-peer devices may be forbidden (e.g., a personal Augmented Reality (AR)/Virtual Reality (VR)/haptic handle Wi-Fi set). Additionally, some peer-to-peer devices may request specific operating conditions (e.g., full power or low power in the 6E bands), which may require information about the device location (e.g., country, indoor, outdoor etc.). Such environmental information may also be requested from the infrastructure, but the AP may decide to only provide this information to authorized devices and not to whomever is in range and asking information about the enterprise assets.

Conventional processes may rely on either manufacturer specific Internet-of-Things (IoT) segmentation and onboarding that may require intimate device knowledge (i.e., to ensure trust) or built-in manufacturer keys such as Pre-Shared Keys (PSKs). Both of these types of solutions may be brittle and may be inefficient due to the need to authenticate within an Enterprise itself, but a peer-to-peer device, connecting to another peer-to-peer device, may not necessarily also connect to the infrastructure network. Accordingly, embodiments of the disclosure may provide a manufacturer-managed authentication framework that may enable local policy such as location sharing and other services to both peer-to-peer devices and non-AP devices alike.

FIG. 1 shows an operating environment 100 for providing secure device location sharing. As shown in FIG. 1, operating environment 100 may comprise a controller 105, a coverage environment 110, a network 115, and an Identity Provider (IdP) 120. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 125, a second AP 130, and a third AP 135. Each of the plurality of APs may be compatible with specification standards such as, but not limited to, the Institute of Electrical and Electronics Engineers (IEEE) 802.11 specification standard for example.

A plurality of devices 140 may be deployed in coverage environment 110. The plurality of APs may provide wireless network access to plurality of devices 140 as the devices move within coverage environment 110. Coverage environment 110 may comprise an outdoor or indoor wireless environment for Wi-Fi or any type of wireless protocol or standard.

Plurality of devices 140 may comprise a first client device 145, a second client device 150, a third client device 155, and a fourth client device 160. Ones of plurality of devices 140 may comprise, but are not limited to, a smart phone, a personal computer, a tablet device, a mobile device, a telephone, a remote control device, a set-top box, a digital video recorder, an Internet-of-Things (IoT) device, a smart watch, a smart Television (TV), a wireless docking station, a network computer, a router, an AR/VR device, an Automated Transfer Vehicle (ATV), a drone, an Unmanned Aerial Vehicle (OVA), a smart wireless light bulb, or other similar microcomputer-based device.

Ones of plurality of devices 140 may comprise peer-to-peer wireless connection devices that may allow two devices to establish a direct Wi-Fi connection without an intermediary AP, router, or Internet connection. For example, first client device 145 may comprise a smart phone and second client device 150 may comprise a smart watch. Accordingly, first client device 145 and second client device 150 may establish a direct Wi-Fi connection between them without an intermediary AP where the smart phone and the smart watch may share data. Furthermore, third client device 155 may comprise a laptop computer and fourth client device 160 may comprise a large screen/keyboard/mouse. Accordingly, third client device 155 and fourth client device 160 may establish a direct Wi-Fi connection between them (via a wireless docking station) without an intermediary AP.

Controller 105 may comprise a Wireless Local Area Network controller (WLC) and may provision and control coverage environment 110 (e.g., a WLAN). Controller 105 may allow plurality of client devices 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide secure device location sharing.

The elements described above of operating environment 100 (e.g., controller 105, IdP 120, first AP 125, second AP 130, third AP 135, first client device 145, second client device 150, third client device 155, and fourth client device 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
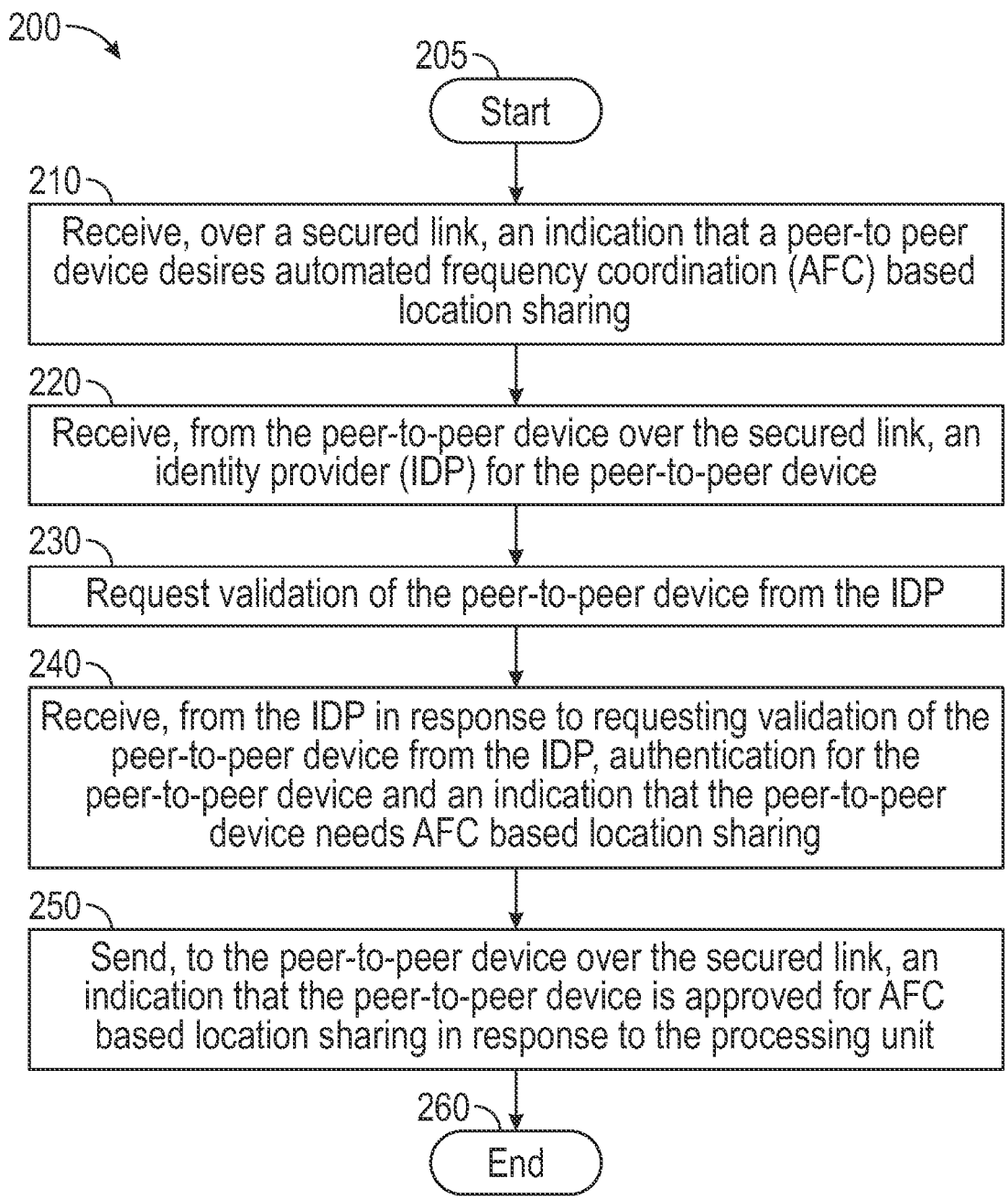
FIG. 2 is a flow chart of a method for providing secure device location sharing.

FIG. 2 is a flow chart setting forth the general stages involved in a method 200 consistent with embodiments of the disclosure for providing secure device location sharing. Method 200 may be implemented using a computing device 300 as described in more detail below with respect to FIG. 3. Computing device 300 may be embodied by controller 105 or any of the plurality of APs for example. Ways to implement the stages of method 200 will be described in greater detail below.

Embodiments of the disclosure may provide processes to allow for authorization of peer-to-peer devices in a Wi-Fi (infrastructure-based) environment, along with the enablement of a policy for sharing location with the peer-to-peer device. This process may augment OpenRoaming (OR) for authorizing "guest" peer-to-peer IoT devices (e.g., unaffiliated peer-to-peer devices, peer-to-peer devices affiliated with an unaffiliated non-AP device, or subordinate devices used for range extension) that may require secure Southbound (SB) location. The OR venue may decide the location sharing policy (e.g., should the device, or nearest AP location be shared, with geographic coordinates or another structure such as country and indoor/outdoor). When the IoT device authenticates (e.g., via Pre-Association Security Negotiation (PASN) or full 802.1X), the OR process may lead to the resolution of the device identity (i.e., Identity Provider (IdP)/Authentication, Authorizing and Accounting (AAA). Upon success, a local policy engine may indicate to a controller or AP that the venue location (e.g., indoor/outdoor, geographic coordinates, etc.) may be shared for that particular devices or peer-to-peer device.

The non-AP device/peer-to-peer device may also indicate in its authentication requests elements that show an intent for Automated Frequency Coordination (AFC) relevant location (e.g., indoor/outdoor) to be shared by the AP via Fine Time Measurement (FTM) or Location Configuration Information (LCI). It may also indicate its role (e.g., laptop/docking station acting on behalf of a display or the display itself) and thus Proxy Identification (PID) for the peer-to-peer device peer (e.g., that may not connect to the infrastructure). When the peer-to-peer device makes the request directly (i.e., not through the other peer), that request may be done through full association, or through PASN based authentication because only the authorization process may be completed and the device may not be given network access. However, regular 802.1X may also be used when association is to a secure "virtual air-gapped" segment.

In the case of PASN, the requestor may use the PASN tunnel to express its identity to an IdP. This may add an authentication element to PASN not only from the device side, but also through the ability of the AP to link to the IdP, the process may allow the device to know that the AP/network is legitimate.

Method 200 may begin at starting block 205 and proceed to stage 210 where computing device 300 may receive, over a secured link, an indication that a peer-to-peer device desires Automated Frequency Coordination (AFC) based location sharing. For example, first client device 145 (e.g., the to-peer device) may discover first AP 125 supports Pre-Association Security Negotiation (PASN), Automatic Coordination Control (AFC), Institute of Electrical and Electronics Engineers (IEEE) 802.11az standard, and/or IEEE 802.11mc standard. First client device 145 may select its credentials (e.g., its manufacturer certificate from its 802.1X/Wi-Fi Protected Access version 3 (WPA3) profile) and provide them to first AP 125 over the secured link.

First client device 145 may perform PASN with first AP 125 using a safe transmit power for that band (e.g., Low Power Indoor (LPI)). The secured link may comprise a PASN secured link. Within the PASN secured link, first client device 145 may indicate in an action frame to first AP 125 its desire for AFC-relevant location (e.g., indoor vs. outdoor, or detailed geographic coordinates).

From stage 210, where computing device 300 receives, over the secured link, the indication that the peer-to-peer device desires AFC based location sharing, method 200 may advance to stage 220 where computing device 300 may receive, from the peer-to-peer device (e.g., first client device 145) over the secured link, an identity provider (IdP) for the peer-to-peer device. For example, first AP 125 may indicate to first client device 145 within PASN that it may support OR. Within the PASN secured link, first client device 145 may indicate its IdP realm.

Once computing device 300 receives, from the peer-to-peer device over the secured link, the IdP for the peer-to-peer device (e.g., first client device 145) in stage 220, method 200 may continue to stage 230 where computing device 300 may request validation of the peer-to-peer device from the IdP. For example, first AP 125 and the WLAN may use the OR mechanism and the OR Federation (e.g., visited AAA) to securely locate the manufacturers IdP (i.e., home AAA) and request validation of the device credentials (e.g., an indication that first client device 145 is a valid device).

After computing device 300 requests validation of the peer-to-peer device from the IdP in stage 230, method 200 may proceed to stage 240 where computing device 300 may receive, from the IdP in response to requesting validation of the peer-to-peer device from the IdP, authentication for the peer-to-peer device and an indication that the peer-to-peer device needs AFC based location sharing. For example, the manufacturer IdP may authenticate first client device 145 within the PASN tunnel, and may return back, along with a successful authorization response to the local infrastructure an indication that the device indeed requires secure location or not.

From stage 240, where computing device 300 receives, from the IdP in response to requesting validation of the peer-to-peer device from the IdP, authentication for the peer-to-peer device (e.g., first client device 145) and the indication that the peer-to-peer device needs AFC based location sharing, method 200 may advance to stage 250 where computing device 300 may send, to the peer-to-peer device over the secured link, an indication that the peer-to-peer device is approved for AFC based location sharing. For example, if authentication is successful and both first client device 145 and its IdP indicate a need for AFC-based location sharing and the local venue policy is also set to authorize location sharing to authenticated but unaffiliated devices, an indication that first client device 145 is approved for AFC based location sharing (i.e., validation) may be sent to first client device 145.

Validation success may be indicated to first client device 145 within the PASN secure link (e.g., the IdP confirmed that first client device 145 is valid, but the device is not associated to first AP 125), along with an approval of location sharing. First client device 145 may initiate Fine Time Measurement (FTM) ranging with first AP 125 and may compute it position relative to first AP 125. First AP 125 may also send its Location Configuration Information (LCI) (i.e., first AP 125's location).

In another embodiment, first client device 145 may range with first AP 125, and may share back its Location Measurement Report (LMR) feedback (e.g., its ranging timers, allowing first AP 125 to deduce the range between first client device 145 and first AP 125). First AP 125 may share this information with an infrastructure location engine, that may return a location probability to first AP 125. This probability may be sufficient for first AP 125 to return to first client device 145 information about indoor/outdoor (e.g., you are indoor with a probability of 97%). In another embodiment, the range may be insufficient to conclude, causing first AP 125 to signal to first client device 145 (e.g., either a low probability value, or a request to range to more APs). First client device 145 may then range to more APs, providing to the location engine (e.g., through this or other APs) more ranging information until the probability value gets above a configurable acceptable threshold.

First client device 145 may deduce, based on this information, whether AFC-governed Standard Power is allowed, and may switch its power mode accordingly for example. Once computing device 300 sends, to the peer-to-peer device over the secured link, the indication that the peer-to-peer device is approved for AFC based location sharing in stage 250, method 200 may then end at stage 260.

In another embodiment, a fourth client device 160 (e.g., a peer-to-peer device) may discover its proxy non-AP device (e.g., fourth client device 160 comprising a display may discover its docking station). The proxy non-AP device and fourth client device 160 may mutually understand their relative position (e.g., using FTM ranging) and fourth client device 160 may indicate its AFC-governed Standard Power support and need for location validation.

Fourth client device 160 may share its device credential, certificate, or other authorization material with the proxy non-AP device. Similar to method 200, the proxy non-AP device may discover an AP (e.g., second AP 130) that supports: Pre-Association Security Negotiation (PASN); Automatic Frequency Coordination (AFC); Institute of Electrical and Electronics Engineers (IEEE) 802.11az standard; and/or IEEE 802.11mc standard.

The proxy non-AP device may select a certificate/credentials from its 802.1X/WPA3 profile as a first layer authentication (i.e., manufacturer or Enterprise credential) and a certificate/credentials of the fourth client device 160 (previously received) it proxies as second layer authentication. The non-AP device may perform PASN with the AP (e.g., second AP 130) and may indicate its desire for AFC-relevant location for itself and/or proxy.

The AP/WLAN may use the first layer authentication for the non-AP device itself either locally (e.g., Enterprise credential) or via OR Federation (e.g. manufacturer credential). In any case, fourth client device 160 (with manufacturer credential) may be authenticated via OR to securely locate the manufacturers IdP (e.g., home AAA) and may authenticate the device credentials (e.g., a valid device). In the case of both first layer authentication and second layer authentication are resolved via OR a suitable 802.1X Extensible Authentication Protocol (EAP) structure (e.g., chaining, tunneling, etc.) may be used as needed.

The manufacturer IdP may perform PASN-compatible authorization and may return back with a successful authorization response an indication fourth client device 160 (e.g., the peer-to-peer device) requires secure location or not. If authorization is successful and both fourth client device 160 (via the proxy non-AP device) and its IdP indicate a need for AFC-based location sharing and the venue policy is also set to authorize location sharing to authenticated but unaffiliated devices, as an extension to method 200:

i) PASN success may be indicated to the proxy non-AP device (but it is not associated), that relays Out of Band (OOB) the success to the peer.
ii) The proxy non-AP device initiates FTM ranging with the AP and computes it position relative to the AP as above. The peer either also performs its FTM-based location determination, or the proxy non-AP device shares with the infrastructure the measured range to the peer. The location engine may then determine the probability of both devices being indoor.
iii) At the final FTM stage, the LCI may be shared and the AFC indoor/outdoor-ness status may be shared with proxy non-AP device.
iv) Fourth client device 160 and proxy non-AP device recompute location based on the ranging with the AP and AFC relevant location is shared with the fourth client device 160.
v) Fourth client device 160 may deduce based on this information whether AFC-governed Standard Power is allowed.

Figure 3:
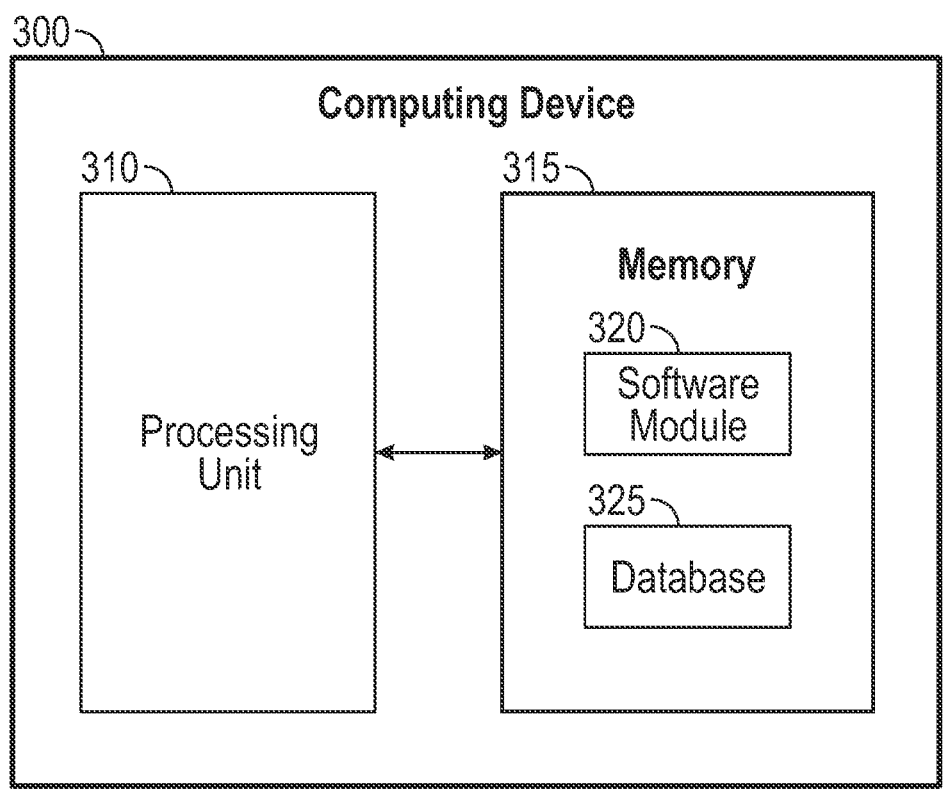
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing secure device location sharing as described above with respect to FIG. 2. Computing device 300, for example, may provide an operating environment for controller 105, IdP 120, first AP 125, second AP 130, third AP 135, first client device 145, second client device 150, third client device 155, and fourth client device 160. Controller 105, IdP 120, first AP 125, second AP 130, third AP 135, first client device 145, second client device 150, third client device 155, and fourth client device 160 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a computing device over a secured link, an indication that a peer-to-peer device desires Automated Frequency Coordination (AFC) based location sharing;
    receiving, from the peer-to-peer device over the secured link, an identity provider (IdP) for the peer-to-peer device;
    requesting validation of the peer-to-peer device from the IdP;
    receiving, from the IdP in response to requesting validation of the peer-to-peer device from the IdP, authentication for the peer-to-peer device and an indication that the peer-to-peer device needs AFC based location sharing; and
    sending, to the peer-to-peer device over the secured link, an indication that the peer-to-peer device is approved for AFC based location sharing in response to:
        receiving the authentication for the peer-to-peer device;
        receiving the indication that the peer-to-peer device needs AFC based location sharing;
        receiving the indication that the peer-to-peer device desires AFC based location sharing; and
        receiving an indication that a local venue policy authorizes AFC based location sharing for authenticated but unaffiliated devices.

2. The method of claim 1, wherein the secured link comprises a Pre-Association Security Negotiation (PASN) secured link.

3. The method of claim 1, further comprising indicating, by the computing device over the secured link to the peer-to-peer device, that the computing device supports at least one of Pre-Association Security Negotiation (PASN), Automatic Frequency Coordination (AFC), Institute of Electrical and Electronics Engineers (IEEE) 802.11az standard, and IEEE 802.11mc standard.

4. The method of claim 1, further comprising receiving, by the computing device over the secured link from the peer-to-peer device, credentials associated with the peer-to-peer device.

5. The method of claim 1, further comprising determining a location of the peer-to-peer device in response to the indication that the peer-to-peer device is approved for AFC based location sharing.

6. The method of claim 1, wherein the computing device comprises an Access Point (AP).

7. The method of claim 1, further comprising:
    receiving, by the peer-to-peer device over the secured link, the indication that the peer-to-peer device is approved for AFC based location sharing; and
    switching, by the peer-to-peer device, a power level of the peer-to-peer device in accordance with AFC in response to receiving the indication that the peer-to-peer device is approved for AFC based location sharing.

8. A system comprising:
    a memory storage; and
    a processing unit disposed in a computing device and coupled to the memory storage, wherein the processing unit is operative to:
        receive, over a secured link, an indication that a peer-to-peer device desires Automated Frequency Coordination (AFC) based location sharing;
        receive, from the peer-to-peer device over the secured link, an identity provider (IdP) for the peer-to-peer device;
        request validation of the peer-to-peer device from the IdP;
        receive, from the IdP in response to requesting validation of the peer-to-peer device from the IdP, authentication for the peer-to-peer device and an indication that the peer-to-peer device needs AFC based location sharing; and
        send, to the peer-to-peer device over the secured link, an indication that the peer-to-peer device is approved for AFC based location sharing in response to the processing unit:
            receiving the authentication for the peer-to-peer device;
            receiving the indication that the peer-to-peer device needs AFC based location sharing;
            receiving the indication that the peer-to-peer device desires AFC based location sharing; and
            receiving an indication that a local venue policy authorizes AFC based location sharing for authenticated but unaffiliated devices.

9. The system of claim 8, wherein the secured link comprises a Pre-Association Security Negotiation (PASN) secured link.

10. The system of claim 8, wherein the processing unit is further operative to indicate, over the secured link to the peer-to-peer device, that the computing device supports at least one of Pre-Association Security Negotiation (PASN), Automatic Frequency Coordination (AFC), Institute of Electrical and Electronics Engineers (IEEE) 802.11az standard, and IEEE 802.11mc standard.

11. The system of claim 8, wherein the processing unit is further operative to receive, over the secured link from the peer-to-peer device, credentials associated with the peer-to-peer device.

12. The system of claim 8, wherein the processing unit is further operative to determine a location of the peer-to-peer device in response to the indication that the peer-to-peer device is approved for AFC based location sharing.

13. The system of claim 8, wherein the computing device comprises an Access Point (AP).

14. A non-transitory computer-readable medium that stores a set of instructions which when executed perform a method executed by the set of instructions comprising:
    receiving, by a computing device over a secured link, an indication that a peer-to-peer device desires Automated Frequency Coordination (AFC) based location sharing;
    receiving, from the peer-to-peer device over the secured link, an identity provider (IdP) for the peer-to-peer device;
    requesting validation of the peer-to-peer device from the IdP;
    receiving, from the IdP in response to requesting validation of the peer-to-peer device from the IdP, authentication for the peer-to-peer device and an indication that the peer-to-peer device needs AFC based location sharing; and sending, to the peer-to-peer device over the secured link, an indication that the peer-to-peer device is approved for AFC based location sharing in response to:
receiving the authentication for the peer-to-peer device;
receiving the indication that the peer-to-peer device needs AFC based location sharing;
receiving the indication that the peer-to-peer device desires AFC based location sharing; and
receiving an indication that a local venue policy authorizes AFC based location sharing for authenticated but unaffiliated devices.

15. The non-transitory computer-readable medium of claim 14, wherein the secured link comprises a Pre-Association Security Negotiation (PASN) secured link.

16. The non-transitory computer-readable medium of claim 14, further comprising indicating, by the computing device over the secured link to the peer-to-peer device, that the computing device supports at least one of Pre-Association Security Negotiation (PASN), Automatic Frequency Coordination (AFC), Institute of Electrical and Electronics Engineers (IEEE) 802.11az standard, and IEEE 802.11mc standard.

17. The non-transitory computer-readable medium of claim 14, further comprising receiving, by the computing device over the secured link from the peer-to-peer device, credentials associated with the peer-to-peer device.

18. The non-transitory computer-readable medium of claim 14, further comprising determining a location of the peer-to-peer device in response to the indication that the peer-to-peer device is approved for AFC based location sharing.

19. The non-transitory computer-readable medium of claim 14, further comprising:
receiving, by the peer-to-peer device over the secured link, the indication that the peer-to-peer device is approved for AFC based location sharing; and
switching, by the peer-to-peer device, a power level of the peer-to-peer device in accordance with AFC in response to receiving the indication that the peer-to-peer device is approved for AFC based location sharing.

20. The non-transitory computer-readable medium of claim 14, wherein the computing device comprises an Access Point (AP).

* * * * *